United States Patent [19]
Bonhomme

[11] Patent Number: 5,689,538
[45] Date of Patent: Nov. 18, 1997

[54] DEVICE AND METHOD FOR RECOVERING AND COOLING THE MOLTEN CORE OF A NUCLEAR REACTOR

[75] Inventor: Nicolaas Bonhomme, Pontoise, France

[73] Assignee: Framatome, Courbevoie, France

[21] Appl. No.: 708,265

[22] Filed: Sep. 6, 1996

[30] Foreign Application Priority Data

Sep. 11, 1995 [FR] France ................................. 95 10625

[51] Int. Cl.⁶ ................................................. G21C 9/016
[52] U.S. Cl. ................................................. 376/280; 376/298
[58] Field of Search ................................. 376/280, 298, 376/299, 407

[56] References Cited

U.S. PATENT DOCUMENTS

| | | | |
|---|---|---|---|
| 3,607,630 | 9/1971 | West et al. | 376/380 |
| 4,342,621 | 8/1982 | Keating, Jr. | 376/298 |
| 4,464,333 | 8/1984 | Wohlsen | 376/280 |
| 4,668,467 | 5/1987 | Miler et al. | 376/298 |
| 5,280,509 | 1/1994 | Py et al. | 376/280 |
| 5,343,506 | 8/1994 | Artnik et al. | 376/280 |

FOREIGN PATENT DOCUMENTS

| | | |
|---|---|---|
| 0 129 933 | 1/1985 | European Pat. Off. . |
| 0 533 529 | 8/1993 | European Pat. Off. . |
| 43 07 543 | 9/1994 | Germany . |
| WO 95/09425 | 4/1995 | WIPO . |

OTHER PUBLICATIONS

Patent Abstracts of Japan, vol. 017, No. 122 (P-1501), JP-A-4305192 (Oct. 28, 1992).

Primary Examiner—Daniel D. Wasil
Attorney, Agent, or Firm—Pollock, Vande Sande & Priddy

[57] ABSTRACT

The device includes a corium collector arranged below the vessel of the reactor, with circulation channels for cooling the collector and the corium. These channels are connected to a water feed and cooling-fluid removal circuit including a water storage tank, a tank for collecting fluid removed from the channels and a steam ejector which receives steam from the cooling fluid originating from the collection tank and sucks water from the storage tank and injects the water into the channels.

10 Claims, 1 Drawing Sheet

DEVICE AND METHOD FOR RECOVERING
AND COOLING THE MOLTEN CORE OF A
NUCLEAR REACTOR

FIELD OF THE INVENTION

The invention relates to a device for recovering and cooling the molten core of a nuclear reactor and, in particular, of a nuclear reactor cooled by pressurized water.

BACKGROUND OF THE INVENTION

Pressurized water nuclear reactors include a generally cylindrical vessel which contains the reactor core and is arranged with its axis vertical in a cylindrical reactor pit having a lower end located in line with the vessel. The nuclear reactor core is cooled by pressurized water circulating in the primary circuit of the reactor and inside the vessel, in contact with the fuel assemblies.

In the case of accidents occurring in the nuclear reactor and leading to a loss of the core cooling function, consideration must be given to the possibility that the reactor might not be activated, given the very serious consequences which would result therefrom, even though such an event is extremely unlikely to occur. An accident sequence may then be produced which leads to core meltdown in the absence of cooling water, which may lead to destruction of the vessel bottom head by perforation and flow of the molten mass of the core and of the materials surrounding the core into the concrete pit containing the reactor vessel. Contact of the molten mass of fuel and materials surrounding the fuel, called corium, the temperature of which may reach 2500° to 2800° C., with the bottom of the concrete reactor pit may, in the absence of cooling, lead to complete destruction of the pit bottom. The corium may then penetrate and destroy the foundation raft in the reactor containment building, and contaminate the ground water present in the soil of the nuclear reactor site. Advance of the corium into the ground cannot be stopped until the residual power of the corium has decayed sufficiently.

It has been proposed to use corium retention and cooling devices arranged below the vessel bottom head, so as to prevent contact of the corium with the concrete reactor pit bottom, in the event of the vessel bottom head being perforated and corium falling through the bottom head.

In order to ensure solidification and cooling of the corium, the corium retention or collection devices arranged below the vessel may include water-circulation cooling means.

For example, FR-A-91-11654, discloses a device for cooling corium and for protecting the structure of the nuclear reactor, which device consists of a metal base covering the bottom of the reactor pit and including cooling channels connected to a circuit for feeding water to the channels and for removing the cooling fluid that has circulated in the channels. Such a device is very effective, insofar as it is possible to cool the metal base, on which the corium is collected, intensely as soon as the corium enters into contact with the metal collection base.

Furthermore, it is desirable for this intense cooling to be obtained without using an energy source external to the cooling circuit, at least in the initial cooling phases, following the falling of the corium.

Finally, it is also desirable to ensure activation of the cooling device automatically immediately after falling of the corium, without having to resort to means for detecting the core meltdown and the vessel bottom head perforation. In fact, it is not possible to obtain operating conditions of the cooling device which are perfectly reliable insofar as recourse to an external energy source such as an electrical supply is avoided, insofar as the energy source may become unavailable during a major accident on the nuclear reactor. Similarly, it is necessary to ensure start-up of the cooling device without resorting to detectors which may be destroyed during an accident on the nuclear reactor, in order to ensure cooling of the corium in all cases immediately after perforation of the vessel and falling of the corium onto the collection device, which is generally placed below the vessel and above the reactor pit bottom.

SUMMARY OF THE INVENTION

The object of the invention is therefore to provide a device for recovering and cooling the molten core of a nuclear reactor, including a molten core collection means, comprising means for cooling the molten core by circulation of water and a circuit for feeding water to the cooling means of the collector and for removing a fluid formed from the cooling water that has circulated in the cooling means, the water feed circuit of the cooling means of the collector being capable of functioning in the absence of any external energy source and being capable of being activated without a means for detecting the core meltdown or the perforation of the vessel bottom head by the molten core mass.

To this end, the water feed circuit of the cooling means of the collector includes:

a water storage tank, a tank for collecting the fluid removed from the cooling means of the collector, comprising means for separating steam and water contained in the fluid and a conduit for removing the fluid into the storage tank, and a steam ejector having a steam inlet connected to the collection tank, a water inlet connected to a pipe for sucking water from the storage tank and a water outlet connected by a feed pipe to the cooling means of the collector.

The invention also relates to a method for recovering and cooling the molten core of a nuclear reactor, including a collector placed below the level of the bottom head of the vessel of the nuclear reactor containing the core, means for cooling the collector by circulation of water and a circuit for feeding water to the cooling means of the collector and for removing a fluid formed from the cooling water that has circulated in the cooling means, wherein the molten core is recovered in the collector, at least a part of the steam is separated from the cooling fluid that has circulated in the cooling means of the collector and which consists of water and steam, the steam is sent into a steam ejector, so as to create a suction effect in the steam ejector, water is withdrawn from a storage tank and the water withdrawn from the storage tank is injected into the cooling means of the collector via the steam ejector.

BRIEF DESCRIPTION OF THE DRAWINGS

In order to explain the invention clearly, a description will now be given, by way of example, with reference to the appended drawings, of a recovery and cooling device according to the invention and its use for cooling the corium of a nuclear reactor whose core has entered meltdown.

DESCRIPTION OF THE PREFERRED EMBODIMENT

Figure 1:
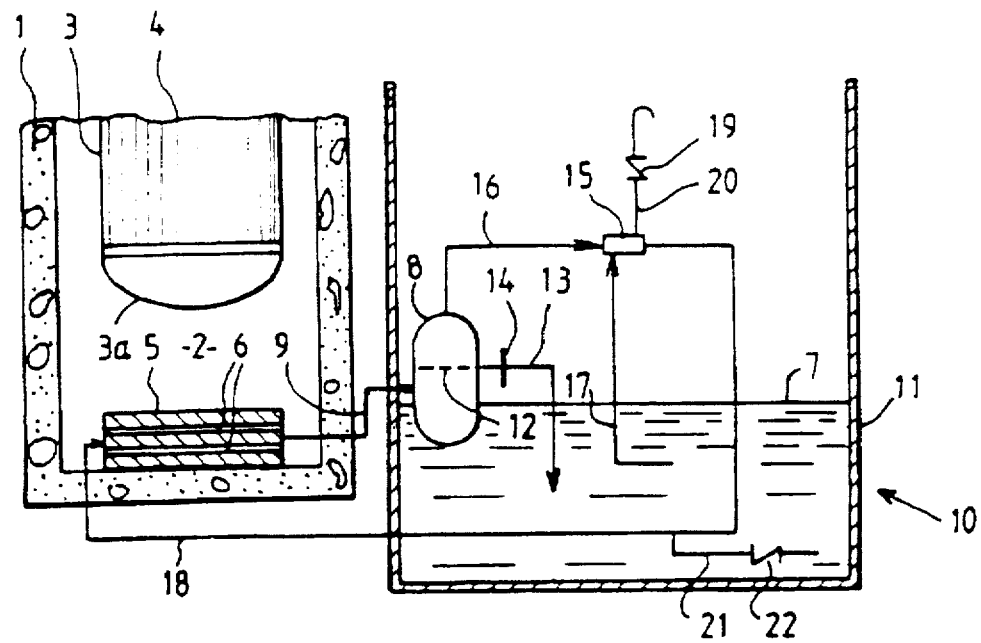
FIG. 1 is a schematic elevation of a device for recovering and cooling the molten core of a pressurized water nuclear reactor.

FIG. 1 shows a part of the concrete structure 1 of a nuclear reactor, delimiting a reactor pit 2 in which the nuclear reactor vessel 3 is arranged which contains the core 4 consisting of fuel assemblies placed inside internals of the nuclear reactor vessel, which hold and support them.

The nuclear reactor core 4 is cooled, during operation of the reactor, by pressurized water circulating in the primary circuit of the reactor and inside the vessel 3.

In the case of an accident leading to interruption in the circulation of primary water in contact with the fuel assemblies, inside the reactor vessel, the core 4 may be cooled by safety cooling systems which are generally redundant.

In the entirely improbable case of failure of all the safety cooling circuits, the core 4 produces heat which can no longer be removed and can therefore melt and lead to meltdown of the internals of the nuclear reactor. The molten mass of the core and of the internals, constituting corium, can then come into contact with the bottom head 3a of the vessel 3 and lead to perforation of the vessel bottom head. The corium can then spread over the bottom of the reactor pit 2.

In order to prevent contact of the corium with the bottom of the reactor pit, use is made of a device for recovering and cooling the corium, which includes a core recovery and retention means 5 arranged below the level of the vessel bottom head 3a.

The collector 5, which may be of any type, consists, for example, of a metal base as described in FR-A-91-11654, covering the bottom of the reactor pit, in line with the bottom head 3a of the vessel 3.

The corium collector 5 includes cooling means which may consist, for example, of water circulation channels 6 arranged inside the metal base constituting the collector 5.

The recovery and cooling device according to the invention, represented in FIG. 1, includes, in addition to the collector 5 equipped with cooling means 6, a circuit 10 for feeding cooling water to the cooling means 6 of the collector 5. The circuit 10 also removes and collects the cooling fluid formed from the cooling water that has circulated in the channels 6 of the collector and has cooled the collector and the corium. The collected cooling fluid consists of water mixed with steam formed by heating of the water by the very hot corium coming into contact with the collector.

The water feed and cooling-fluid removal circuit 10 includes a large storage tank 11 containing a large quantity of cooling water up to the level 7 visible in FIG. 1.

The collection and cooling circuit 10 furthermore includes a tank 8 for collecting the fluid formed by the water that has circulated in the cooling channels 6 of the collector 5 and consists of a mixture of water and steam.

The collection tank 8 consists of a metal enclosure of cylindrical overall shape, closed at its extremities by hemispherical ends. The internal volume of the collection tank 8 is connected via a fluid removal conduit 9 to the outlet of the cooling channels 6 of the collector 5.

The control part of tank 8, above the point where the removal conduit 9 joins, includes a separation device 12 making it possible to retain the water contained in the water/steam two-phase fluid originating from the outlet of the cooling channels 6 of the collector 5. The separation device 12 may, for example, consist of a grid and/or chicane separator.

A cooling fluid removal conduit 13 is connected to the casing of the collection tank 8 so as to open into the internal volume of the collection tank 8 at or slightly below the level of the separation device 12. The two-phase fluid removal conduit 13 opens, at its opposite end from the collection tank 8, into the water storage tank 11.

A diaphragm 14 having a calibrated orifice is interposed on the removal conduit 13.

The recovery and cooling device according to the invention also includes a steam ejector 15 including a steam inlet connected via a conduit 16 to the collection tank 8, so that the conduit 16 opens to the upper part of the internal volume of the collection tank 8, a water inlet connected to a suction conduit 17 that is immersed in the water of the storage tank 11, and a water outlet opening connected via a feed pipe 18 to the inlet of the cooling channels 6 of the collector 5. In addition, a conduit 20 constituting an overflow pipe and a vent for purging the circuit when it is filled is connected to the outlet of the steam ejector 15. A non-return valve 19 is arranged on the conduit 20. The end of the conduit 20 opposite the steam ejector 15 opens above the water level 7 to the interior of the storage tank 11.

The feed and removal circuit 10 also includes a filling pipeline 21 which is immersed in the water of the storage tank 11 and on which a non-return valve 22 is placed.

When the nuclear reactor is in normal operation, the cooling device is not in operation and the filling line 21 fills the water feed circuit 10 and the cooling channels 6 of the collector 5, so that cooling of the collector and of the corium can be ensured as soon as corium enters into contact with the surface of the collector 5.

In addition, the line 20 allows removal of any gas or steam reaching the steam ejector 15.

In the event of an accident leading to core meltdown and vessel perforation, the corium which pours out onto the collector 5 causes heating of the water contained in the cooling channels 6 of the collector. The water heated in the cooling channels of the collector 5 undergoes thermal expansion and flows through the removal line 9 into the tank 8. Filling of the pipe 18 for feeding the cooling channels of the collector continues to be ensured by the filling conduit 21. The water in the collection tank 8 is removed via the discharge line 13 into the storage tank 11.

The very intense heating of the collector 5 by the corium leads very quickly to vaporization of a part of the water circulating in the cooling channels 6. Steam reaches the interior of the collection tank 8 in a mixture with the cooling water. The steam rises inside the collection tank 8. The separation device 12 separates the water and the steam in the two-phase mixture, so that the upper part of the collection tank 8 receives steam which is removed via the conduit 16 to the steam inlet of the ejector 15. The steam passes through the ejector then is removed at the outlet of the ejector via the removal and vent conduit 20.

The steam ejector 15 is of the automatic self-starting type. When the flow rate of steam removed via the vent line is sufficient, start-up of the steam ejector takes place. The steam flow rate is then sufficient to suck water from the storage tank 11 via the suction line 17 and drive the water sucked from the tank 11 into the feed pipe 18 connected to the inlet of the cooling channels of the collector 5. The non-return valve 19 recloses and the feed circuit 10 is then primed to operate continuously. The water sucked from the storage tank 11 then driven through the feed pipe 18 circulates in the cooling channels 6 of the collector 5 where it is heated and is partially vaporized.

The two-phase mixture reaches the collection tank 8 via the removal conduit 9. A part of the steam separated from the two-phase mixture reaches the upper part of the collection tank 8 and, via the conduit 16, reaches the steam ejector 15, this steam constituting the drive element of the steam ejector. The two-phase mixture passing through the diaphragm 14 having calibrated orifices is returned into the mass of water filling the storage tank 11 up to the level 7. The mass of water filling the tank 7 cools the two-phase mixture. The steam ejector 15 sucks cooling water from the storage tank 11 via the conduit 17 and drives cooling water through the feed pipe 18. The valve 22 of the filling conduit 21 is closed, so that the feed pipe is isolated from the storage tank 11.

Figure 2:
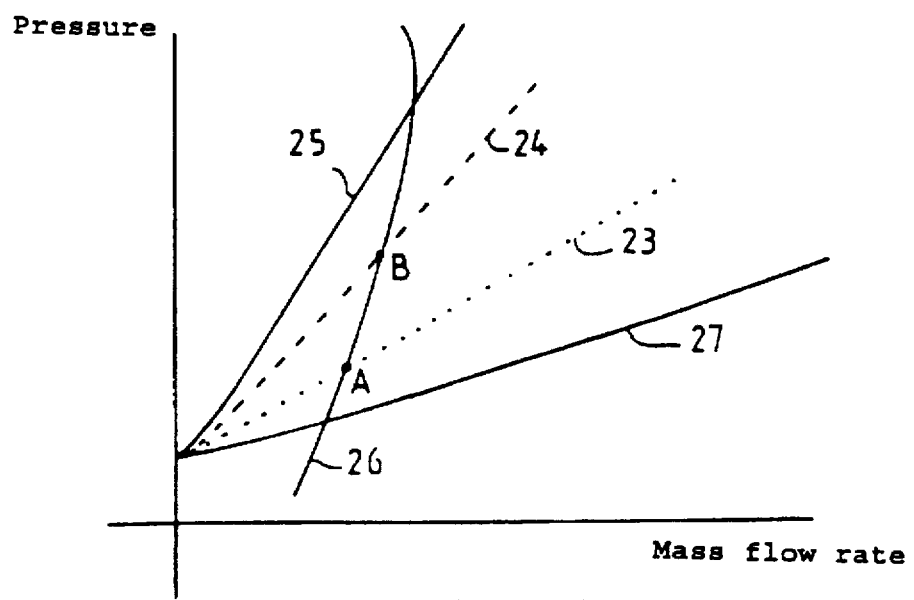
FIG. 2 is a diagram of the operation of the water feed circuit of the recovery and cooling device according to the invention.

FIG. 2 represents the operating characteristic 26 of the steam ejector 15. When the pressure of the steam increases, the mass flow rate of water injected by the steam ejector into the feed pipe 18 increases slowly up to a maximum value and then decreases because of the cavitation of the liquid at the inlet of the steam ejector.

FIG. 2 also represents the operating characteristics 27, 23, 24 and 25 of the discharge line 13 connected to the collection tank 8, corresponding to removal of a fluid having variable composition. Curve 27 corresponds to the removal of water containing no steam, curve 25 corresponds to the removal of steam and curves 23 and 24 correspond to water/steam two-phase mixtures in different proportions. Curve 23 corresponds to the removal of a two-phase mixture containing more water and less steam than the two-phase mixture whose removal is represented by curve 24.

At the intersection of the operating characteristic 26 of the steam ejector and of the characteristics 23 and 24 of the discharge line, the operating points A and B for operation with removal of the first and of the second two-phase mixture, respectively, are determined. The points A and B correspond to possible steady-state operating points, point B corresponding to the higher thermal load.

The stationary-state operation is very stable, because the pressure increase tends to increase the discharge rate and therefore to decrease the level in the collection tank. The flow rate of cooling water in the collector increases, which leads to a decrease in pressure and a return to the initial steady-state operating point.

The variations in thermal loading lead to an adjustment of the operating point of the gas ejector on curve 26.

If the supply of heat when the corium falls were not sufficient to activate the steam ejector, cooling by natural convection and discharge through the calibrated orifice of the discharge line would nevertheless be produced. This circulation would ensure limited cooling. This type of operation is, however, very hypothetical, because the supply of heat if the vessel is perforated is almost certain to lead to operation with the steam ejector in service, that is to say operation with forced circulation of the cooling water and therefore with strong cooling of the collector 5.

The corium collection device according to the invention therefore has the advantage that it can be cooled by circulation of water without an external energy supply and without having to bring about activation of the cooling means if corium falls onto the corium collector. The device can operate extremely efficiently until the corium solidifies on the collector. Furthermore, operation of the cooling means of the collector is self-regulated.

It is generally preferable to place the water storage tank, the cooling fluid collection tank and the steam ejector outside the safety building of the nuclear reactor, but placement of these means inside the safety building is also possible.

It is possible to provide a storage tank having a very large capacity and a collection tank drainage pipeline equipped with any type of device having a head loss. The device ensuring a head loss on the conduit for removing cooling fluid from the collection tank makes it possible to adapt the operation of the circuit for removing cooling fluid and for feeding cooling water to the collector to various types of accident which may be produced in the nuclear reactor and which lead to at least partial meltdown of the core.

The collector may be produced in a form other than a metal base including cooling channels. The collector may be placed directly under the vessel bottom head, but it may also be placed in a room located beside the reactor pit, in which case a drive device directs the corium towards the collector. The storage tank, the collection tank and the steam ejector may be produced in any form which provides the characteristics required for remedying any accidental operation of the reactor with core meltdown.

The same is true of the discharging line of the collection tank, including a means for introducing a head loss on the outlet of the cooling fluid.

The invention applies to any nuclear reactor including a vessel, containing the reactor core, whose bottom head that is capable of being perforated by the core when in meltdown, is located above a slab or a reactor pit bottom which it is necessary to protect.

I claim:

1. A device for recovering and cooling the molten core of a nuclear reactor, including a molten core collector, comprising means for cooling the molten core by circulation of water and a circuit for feeding water to the cooling means of the collector and for removing a fluid formed from the cooling water that has circulated in the cooling means, said device including
   (a) a water storage tank;
   (b) a tank for collecting the fluid removed from the cooling means of the collector, comprising means for separating steam and water contained in the fluid and a conduit for removing the fluid into the storage tank; and
   (c) a steam ejector having a steam inlet connected to the collection tank, a water inlet connected to a pipe for sucking water from the storage tank and a water outlet connected by a feed pipe to the cooling means of the collector.

2. The device according to claim 1, including a head-loss device arranged on the conduit for removing the fluid into the storage tank.

3. The device according to claim 2, wherein the head-loss device consists of a calibrated-orifice diaphragm.

4. The device according to claim 1, wherein the feed and removal circuit includes an overflow and vent conduit connected to an outlet part of the steam ejector.

5. The device according to claim 1, wherein the feed pipe of the cooling means of the collector is connected to a water feed pipeline communicating with the water storage tank and on which a non-return valve is placed.

6. The device according to claim 4, wherein a non-return valve is placed on the overflow and vent conduit.

7. The device according to claim 1, wherein the corium collector consists of a metal base in which water-circulation cooling channels constituting the cooling means of the collector are provided.

8. A method for recovering and cooling the molten core of a nuclear reactor, including a collector placed below the level of a bottom head of a vessel of the nuclear reactor containing the core, means for cooling the collector by circulation of water, and a circuit for feeding water to the cooling means of the collector and for removing a fluid formed from the cooling water that has circulated in the cooling means, said method comprising the steps of (a) recovering the molten core in the collector;

(b) separating at least a part of the steam from the cooling fluid that has circulated in the cooling means of the collector and which consists of water and steam;

(c) sending the remaining part of the cooling fluid into a water storage tank of the feed circuit;

(d) sending the steam into a steam ejector so as to create a suction effect in the steam ejector;

(e) withdrawing water from the storage tank; and (f) injecting the water withdrawn from the storage tank into the cooling means of the collector via the steam ejector.

9. The method according to claim 8, including the step, prior to collecting the molten core in the collector, of completely filling the feed circuit by supplying water from the storage tank into the feed circuit and removing gas or steam contained in the feed circuit via a removal and vent conduit connected to the feed circuit.

10. The method according to claim 8, comprising the step of creating a head-loss on the removal of the remaining part of the cooling fluid into the water storage tank.

* * * * *